United States Patent
Janczak et al.

(10) Patent No.: US 8,434,074 B2
(45) Date of Patent: Apr. 30, 2013

(54) REGISTER ALLOCATION WITH SIMD ARCHITECTURE USING WRITE MASKS

(75) Inventors: Tomasz Janczak, Gdansk (PL); Ben J. Ashbaugh, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 601 days.

(21) Appl. No.: 12/711,319

(22) Filed: Feb. 24, 2010

(65) Prior Publication Data

US 2011/0209127 A1  Aug. 25, 2011

(51) Int. Cl.
*G06F 9/45* (2006.01)

(52) U.S. Cl.
USPC ..... 717/140; 717/141; 717/144; 704/E15.048

(58) Field of Classification Search .............. 717/141, 717/144; 704/E15.048
See application file for complete search history.

(56) References Cited

U.S. PATENT DOCUMENTS

| | | | | |
|---|---|---|---|---|
| 5,249,295 | A * | 9/1993 | Briggs et al. ............... | 717/157 |
| 7,181,730 | B2 * | 2/2007 | Pitsianis et al. ............ | 717/132 |
| 8,225,295 | B2 * | 7/2012 | Palsberg et al. ............ | 717/140 |
| 2002/0019910 | A1 * | 2/2002 | Pitsianis et al. ............ | 711/125 |
| 2004/0123072 | A1 * | 6/2004 | Kailas et al. ................ | 712/23 |
| 2007/0038984 | A1 * | 2/2007 | Gschwind et al. .......... | 717/136 |
| 2008/0005722 | A1 * | 1/2008 | Matsuzaki .................. | 717/122 |
| 2008/0270771 | A1 * | 10/2008 | Lee et al. .................... | 712/228 |
| 2009/0083721 | A1 * | 3/2009 | Palsberg et al. ............. | 717/140 |
| 2010/0162220 | A1 * | 6/2010 | Cui et al. .................... | 717/155 |

FOREIGN PATENT DOCUMENTS

EP  1049007 A2 *  11/2000

OTHER PUBLICATIONS

Wahlen, "C Compiler Aided Design of Application-Specific Instruction-Set Processors Using the Machine Description Language LISA", Apr. 5, 2004.*
Norris et al., "Register Allocation over the Program Dependence Graph", 1994.*
Poletto et al., "Linear Scan Register Allocation", 1999.*
Chaitin et al., "Register Allocation Via Coloring", 1981.*

* cited by examiner

*Primary Examiner* — Phillip H Nguyen
(74) *Attorney, Agent, or Firm* — Trop, Pruner & Hu, P.C.

(57) ABSTRACT

A single instruction multiple data processor may accomplish register allocation by identifying live ranges that have incompatible write masks during compilation. Then, edges are added in an interference graph between live ranges that have incompatible masks so that those live ranges will not be assigned to the same physical register.

14 Claims, 5 Drawing Sheets

REGISTER ALLOCATION WITH SIMD ARCHITECTURE USING WRITE MASKS

BACKGROUND

This relates generally to processors and, particularly, to single instruction multiple data processors.

A single instruction multiple data (SIMD) processor is a processor in which each instruction can operate on multiple data elements in parallel. Some single instruction multiple data processors can operate in different lengths, such as SIMD8, SIMD16, or SIMD32.

A physical SIMD register has a large number of bits which may be used to store multiple smaller data elements. The mode of operation may be loosely described as SIMDm×n, where "m" is a numerical term describing the size of the vector and "n" is the number of concurrent program flows executed in SIMD. SIMD8, short for SIMD1×8, stands for the SIMD operation based on the structure of arrays data structure where one register contains one data element (the same one) of eight vectors. Effectively, there are eight concurrent program flows. SIMD16 is short for SIMD1×16, where each SIMD instruction operates on a pair of registers that contain one data element (the same one) of 16 vectors. SIMD16 has 16 concurrent program flows.

A write mask may be used to allow part of a register to be computed through one control flow branch and another part of the register to be computed through another control flow branch. Execution errors may occur when a register, written with one mask in one control flow branch, is written with a different mask in a parallel control flow branch.

For example, a simple execution error uses a "no mask" modifier in the "parallel" branch of an instruction that block loads constant data into a register that was also written in the "then" branch. An instruction with the no mask modifier may overwrite data that was written in the "then" branch. If the no mask modifier were omitted or if a different register were used as the destination for the block load, no meaningful data would be overwritten. In this case, however, the no mask modifier is required and most register allocation algorithms will allow the same destination to be used for each instruction.

Typically, this means that the mask modifiers or write masks may not be used unless all "parallel" branches use the same type of masks, e.g. the same width of mask. This inability to use write masks or mask modifiers with different types of write masks may result in reduced efficiency because of the use of a smaller number of concurrent program flows.

DETAILED DESCRIPTION

In accordance with some embodiments of the present invention, live ranges that cannot have incompatible (i.e. colliding) write masks may be detected before or during a build phase of a register allocation algorithm. As a result, conflicts can be detected and corrective action may be taken. This is in contrast with conventional techniques which simply determine whether or not a conflict is possible and take corrective action, whether or not the conflict would actually, in fact, have occurred.

In accordance with some embodiments, such conflicts may be remedied by the addition of edges to an interference graph. This is in contrast to conventional techniques which may simply preclude the use of two different single instruction multiple data modes. Thus, for example, in an architecture that allows both SIMD8 and SIMD16, only the mode using the smaller number of flows may be used or only the lower portion of the write mask may be used to avoid the possibility of conflicts in some conventional approaches.

Figure 1:
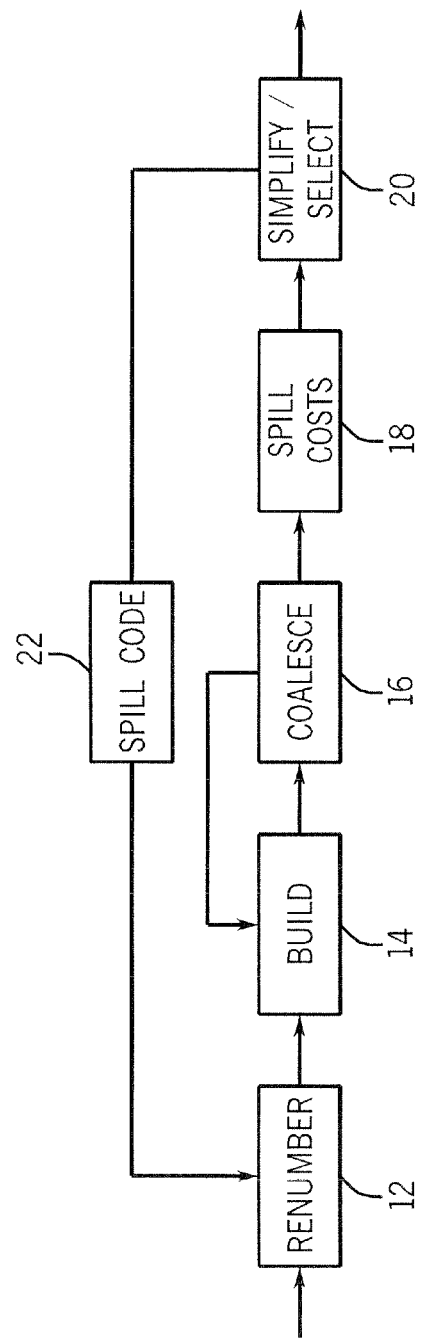
FIG. 1 is a flow chart for one embodiment of the present invention.

In some embodiments, a graph coloring register allocation algorithm may be utilized to allocate variables and live ranges to particular registers. In such case, both detection and conflict-resolution can be added to build phase of register allocation algorithm, as illustrated in FIG. 1. A register allocation is a process of assigning program variables onto a smaller number of processor registers. The general goal is to keep as many operands as possible in registers to maximize the execution speed of the resulting program.

Different register allocation mechanisms are known, including bin packing, priority based graph coloring, such as Chow-style allocators, bottom up graph coloring, such as Chaitin-style allocators, and linear-scan register allocation approaches (which are common in just-in-time (JIT) compilers). In accordance with some embodiments of the present invention, a Chaitin-Briggs graph coloring register allocation algorithm is utilized, but, in other embodiments, other register allocation algorithms may be used.

The register allocation algorithm attempts to guarantee that registers are not written with incompatible masks in parallel control flow branches. This may be done, in some embodiments, by using a graph coloring register allocation algorithm 10, shown in FIG. 1. The idea is to allocate as many variables to registers as possible and to only spill variables to main memory as necessary. In accordance with an embodiment using Chaitin-Briggs graph coloring, in a renumbering phase 12, each variable is given its own uniquely numbered logical register. This renumbering phase may also be known as register variable recognition.

In the build phase 14, an interference graph is developed. Variables and live ranges are represented as vertices in an undirected graph and two vertices (also called "nodes") may be connected by an edge when their corresponding variables interfere because they both exist at the same time. The vertex coloring of this graph can be viewed as a register allocation, with each register represented by a vertex color and no vertex has the same color as its neighbor. A live range is the time interval when a variable is active. Variables and live ranges may be treated interchangeably in some embodiments.

An edge is drawn between two variables when they both exist at the same time and thereby interfere. Thus, the interfering variables need to exist at different register locations or have a different color in the graph to avoid a conflict.

Next, a coalesce stage 16 attempts to optimize the path for each graph. Nodes are coalesced, where possible, by replacing two non-interfering variables with one variable to reduce the size of the graph coloring problem.

Next, the spill cost is calculated at block 18. After the interference graph is built, it may not be possible to map all of the nodes to registers, given a limited number of registers. So some nodes may be spilled or moved to external memory.

The aim is to spill those nodes that result in the least spill cost. The spill cost is the cost of spilling a node to external memory and may depend on a number of factors, including how often the variable is used. A heuristic measure of the decrease in execution performance due to spilling may be used to prioritize which nodes are spilled. This prioritization determines an order in which nodes are moved to external memory.

Next, in the simplify/select phase 20, the actual coloring of the graph is done by applying the available colors to each vertex node, with the colors corresponding to different registers. This may be done one block after another. A block is simply a chunk of code to be compiled.

After the phase 20, the spill code is actually determined in block 22. The spill code is that code needed to cause a variable to be spilled over to external memory. The flow executes for all blocks and before moving to the next stage. Then after the simplify/select stage, the following cycles back to the beginning after determining the spill code.

Figure 2:
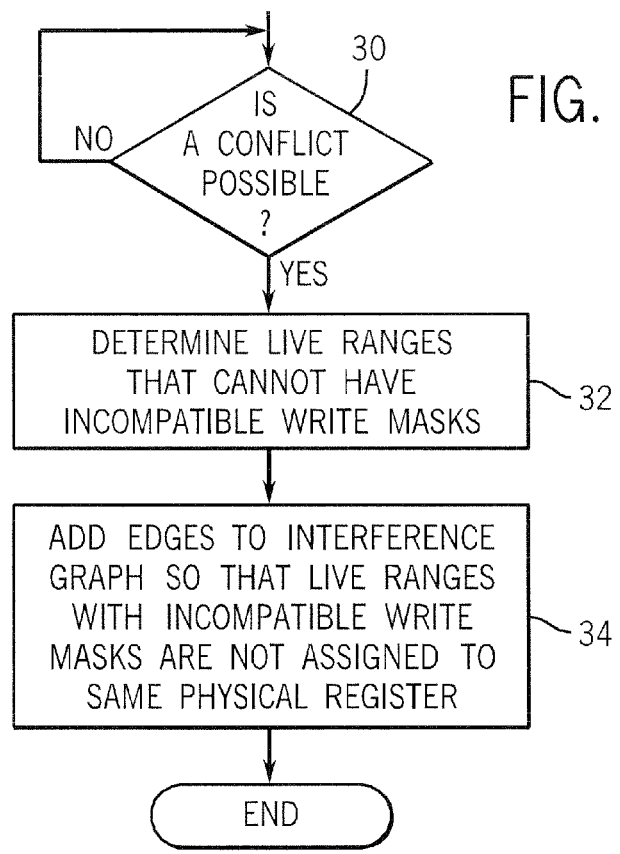
FIG. 2 is a flow chart for the build phase of the flow chart shown in FIG. 1 in accordance with one embodiment.

Referring next to FIG. 2, in accordance with one embodiment, the build phase 14 begins at diamond 30 by determining whether a conflict between two write masks is possible. If so, at block 32, those live ranges that cannot have incompatible write masks are actually determined. Next, edges are added to the interference graph at block 34 so that the live ranges with incompatible write masks are not assigned to the same physical registers.

Figure 3:
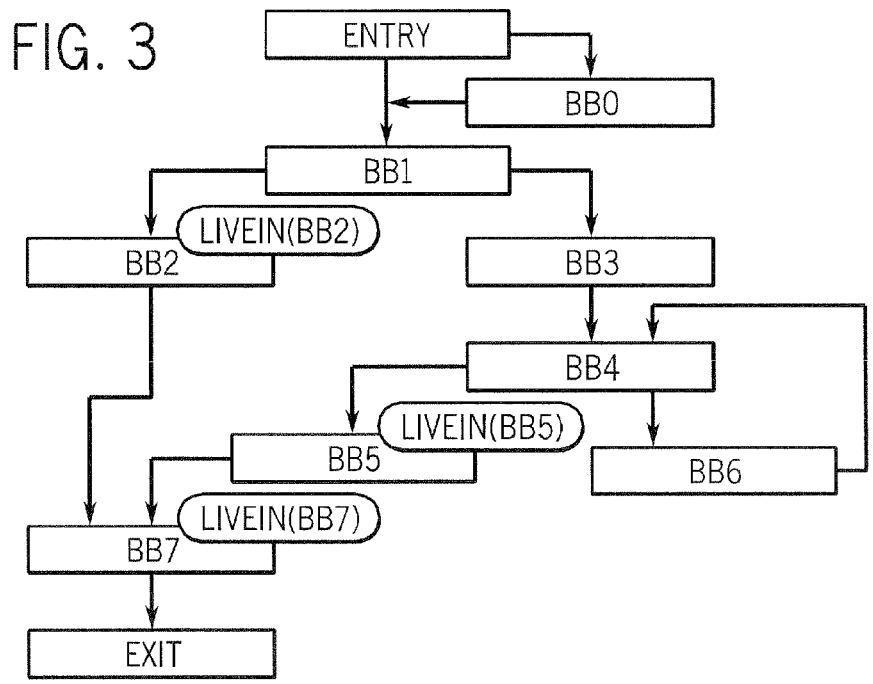
FIG. 3 is a hypothetical control flow graph.

Thus, referring to FIG. 3, a hypothetical control flow graph may include an entry block, followed by a series of blocks numbered BB0 to BB7, in this example, before an exit block. The control flow graph shows the logical flow of the algorithm to be compiled.

Figure 4:
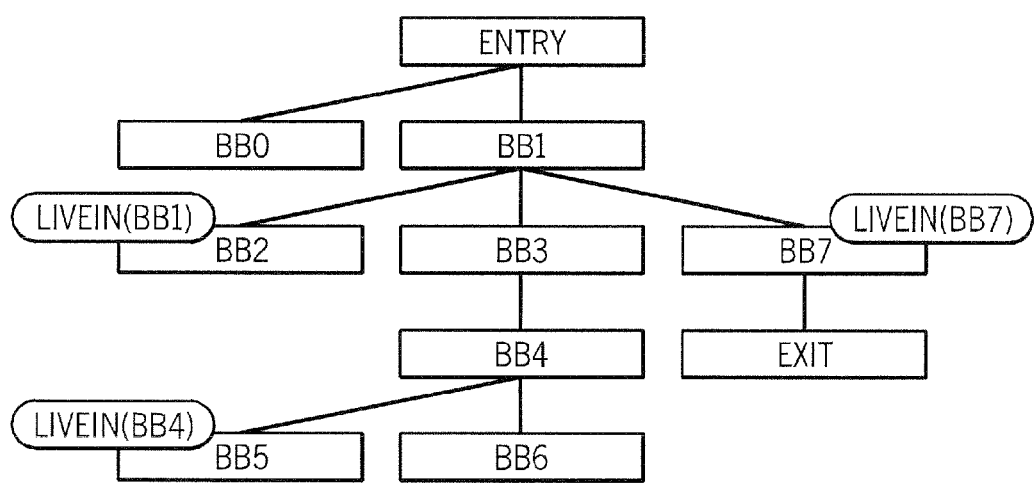
FIG. 4 is a hypothetical dominance tree.

FIG. 4 shows a hypothetical dominance tree for the control flow graph shown in FIG. 3. The dominance tree is used in compilers to determine which basic blocks are children of another basic block in the tree. A block is a parent of a child block if the flow is guaranteed to go through the parent block to get to the child block. For example, in the control flow graph of FIG. 3, basic block 1 (BB1) is the parent of basic block 2 (BB2), as indicated in the dominance tree of FIG. 4.

Thus, the dominance tree indicates which nodes (called parent nodes) are traversed to get to other nodes (called child nodes). The dominance tree may be derived by a compiler from the control flow graph, but the compiler cannot derive the control flow graph from the dominance tree. The dominance tree is used to find parallel branches and parallel live sets in one embodiment. Parallel live sets are sets of live ranges that cannot have incompatible write masks.

A basic block that is parallel to another basic block is an immediate successor of the basic block's dominant tree predecessor up to a predecessor that dominates the exit block that is not in the basic block's dominance paths. In other words, parallel blocks may include entry nodes to parallel execution branches. Basic block 2 is an entry node to a parallel execution branch to basic block 6. Parallel blocks also include "join nodes" from parallel execution branches. Basic block 7 is a join node for the basic block 6 in this example. Parallel blocks also include "critical edge nodes." Basic block 5 is a critical edge node to the basic block 6 in this example. As indicated, the live-in sets for the basic blocks are indicated in ovals in FIGS. 3 and 4 for basic blocks that are parallel to basic block 6. The live-in sets collectively describe a parallel live set. Thus, parallel blocks may be automatically detected, in some embodiments, as entry nodes to parallel execution branches, join nodes from parallel execution branches, or as critical edge nodes, in some embodiments.

The entry node, the basic block 1, the basic block 3, and the basic block 4 are not considered to be parallel to basic block 6 since they are on the same dominance path that includes basic block 6. Furthermore, the basic block 0 is not considered to be parallel because the basic block 1 dominates the exit node and nodes upstream of basic block 1 are not examined. Finally, even though the basic block 7 is not intuitively parallel to basic block 6, the basic block 7 node's live-in set is parallel to basic block 6. This is because live ranges that are live-in to the basic block 7 node are in the live-out sets of nodes that are parallel to basic block 6. Specifically, the live-in set of basic block 7 is composed of the live-out sets of basic block 2 and basic block 5. More generally, live-in sets of join nodes are the same as live-out sets of their predecessor nodes. By including the live-in sets of join nodes in the parallel live set, the algorithm does not need to consider live-out sets.

Once the parallel live set for the basic block has been found, each instruction in the basic block is examined and a check determines if its write mask is incompatible with each live range's mask in the parallel live set. If it is, the algorithm inserts an interference between the live range and the instruction's destination (which may not have interfered in the original Chaitin-Briggs algorithm).

Two masks are incompatible if they can write to the same SIMD sub-channel in parallel branches. In some embodiments, the need to avoid instructions with incompatible write masks may be avoided and may be handled with little or no loss of efficiency.

Figure 5:
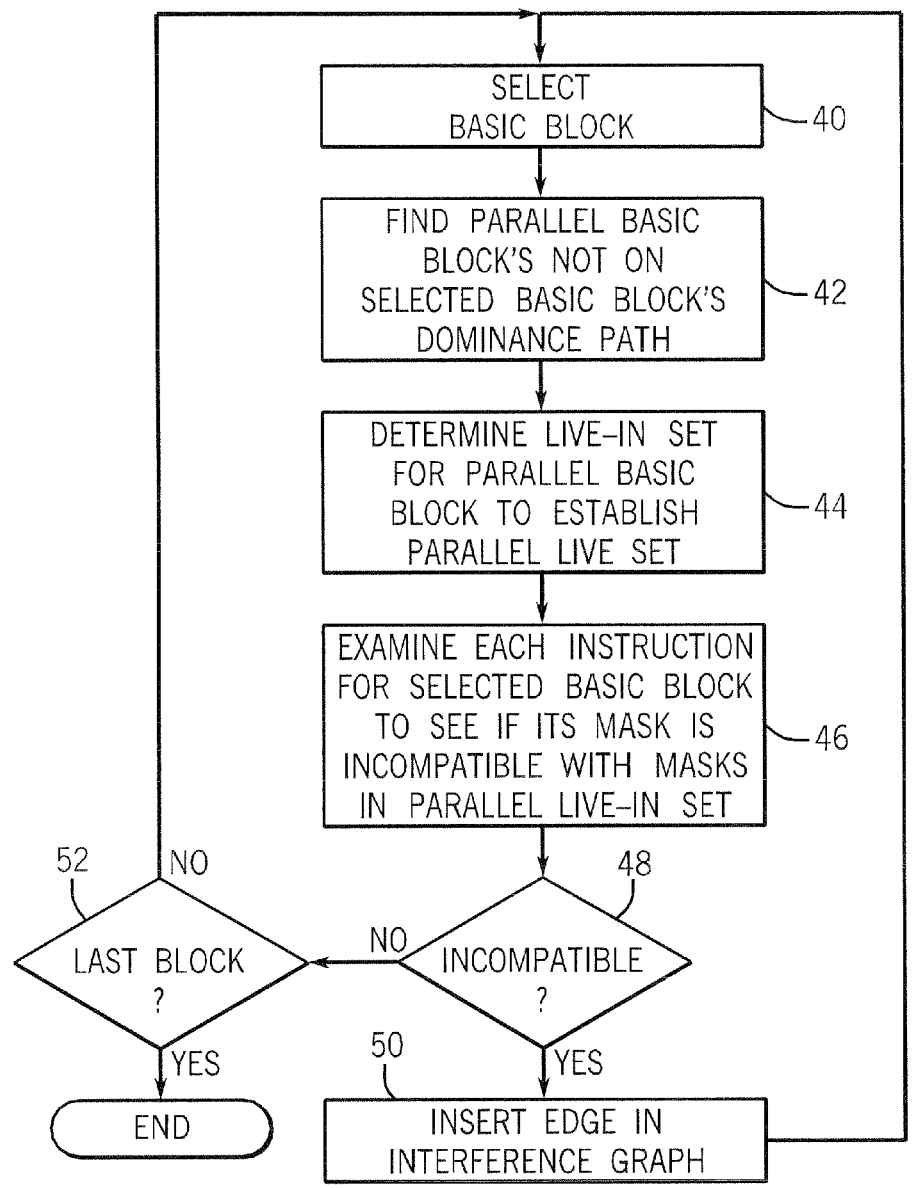
FIG. 5 is a flow chart for the build phase in accordance with another embodiment of the present invention.

Referring to FIG. 5, in accordance with a more detailed embodiment, at block 40 an initial basic block is selected. Then parallel basic blocks not on the selected basic block's dominance path are identified, as indicated in block 42. Next, the live-in sets for parallel basic blocks are determined to establish a parallel live-in set, as indicated in block 44.

Each instruction for the selected basic block may then be examined to see if its mask is incompatible with masks in the parallel live-in set, as indicated in block 46. If there is no incompatibility, as determined in diamond 48, a check at diamond 52 determines whether this is the last block. If so, the flow ends and, otherwise, the flow iterates back to block 40.

If there is incompatibility, then an edge is inserted in the interference graph, as indicated in block 50, and the flow iterates.

Figure 6:
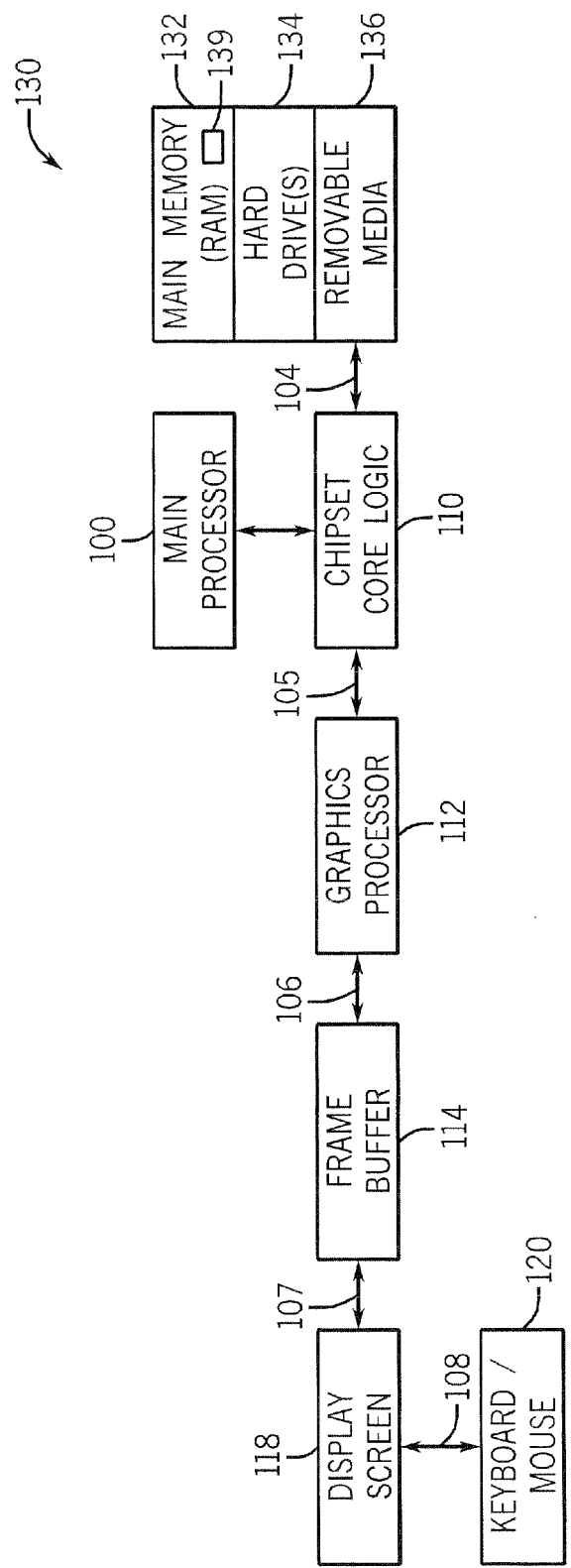
FIG. 6 is a schematic depiction of a computer system in accordance with one embodiment.

A computer system 130, shown in FIG. 6, may include a hard drive 134 and a removable medium 136, coupled by a bus 104 to a chipset core logic 110. The core logic may couple to a graphics processor 112 (via bus 105) and the main processor 100, in one embodiment. The graphics processor 112 may also be coupled by a bus 106 to a frame buffer 114. The frame buffer 114 may be coupled by a bus 107 to a display screen 118, in turn coupled to conventional components by a bus 108, such as a keyboard or mouse 120.

In the case of a software implementation, the pertinent code, to implement the sequences of FIGS. 2 and 5, may be stored in any suitable semiconductor, magnetic, or optical memory, including the main memory 132, also sometimes referred to herein as external memory. Thus, in one embodiment, the code 139 may be stored in a machine readable medium, such as the main memory 132 or frame buffer 114, for execution by a processor, such as a processor 100 or a graphics processor 112.

In a software embodiment, the sequences, shown in FIGS. 2 and 5, may be part of a graphics processor 112. However, the sequences may also be implemented in software stored in frame buffer 114 or in main memory 132, as indicated in 139. Of course, such software could be resident on the graphics processor 112 or any other storage device.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining a live range that cannot have colliding write masks during compilation for a single instruction multiple data processor;
   using a dominance tree to determine a live range that cannot have a colliding write mask; and
   finding a parallel basic block that is not on a selected basic block's dominance path.

2. The method of claim 1 including adding an edge to an interference graph so that live ranges with incompatible write masks will not be assigned to a same physical register.

3. The method of claim 1 including determining live sets for parallel basic block to establish a parallel live-in set.

4. The method of claim 3 including examining each instruction for the selected basic block to see if its mask is incompatible with masks in the parallel live-in set.

5. A non-transitory computer readable medium storing instructions to enable a computer to:
   add an edge to an interference graph so that live ranges with incompatible write masks will not be assigned to a same physical register;
   use a dominance tree to determine a live range that cannot have a colliding write mask; and
   find a parallel basic block that is not on a selected basic block's dominance path.

6. The medium of claim 5 further storing instructions to determine a live range that cannot have colliding write masks during compilation for a single instruction multiple data processor.

7. The medium of claim 5 further storing instructions to determine live sets for parallel basic block to establish a parallel live-in set.

8. The medium of claim 7 further storing instructions to examine each instruction for the selected basic block to see if its mask is incompatible with masks in the parallel live-in set.

9. An apparatus comprising:
   a single instruction multiple data processor to determine a live range that cannot have colliding write masks during compilation and to find a parallel basic block that is not on a selected basic block's dominance path and wherein said processor to use a dominance tree to determine a live range that cannot have a colliding write mask; and
   a memory coupled to said processor.

10. The apparatus of claim 9, said processor to add an edge to an interference graph so that live ranges with incompatible write masks will not be assigned to a same physical register.

11. The apparatus of claim 9, said processor to determine live sets for parallel basic block to establish a parallel live-in set.

12. The apparatus of claim 11, said processor to examine each instruction for the selected basic block to see if its mask is incompatible with masks in the parallel live-in set.

13. The apparatus of claim 9 wherein said processor is a graphics processor.

14. The apparatus of claim 9 wherein said memory is system memory.

* * * * *